United States Patent
Herndon et al.

(10) Patent No.: US 6,975,484 B2
(45) Date of Patent: Dec. 13, 2005

(54) SELECTIVELY STIFF FDB BEARING FOR BETTER SERVO WRITE

(75) Inventors: Troy Michael Herndon, San Jose, CA (US); Norbert Steven Parsoneault, Scotts Valley, CA (US); Donald James Macleod, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 447 days.

(21) Appl. No.: 10/087,116

(22) Filed: Mar. 1, 2002

(65) Prior Publication Data

US 2003/0117738 A1 Jun. 26, 2003

Related U.S. Application Data

(60) Provisional application No. 60/342,681, filed on Dec. 20, 2001.

(51) Int. Cl.$^7$ .......................... G11B 17/02; G11B 21/02
(52) U.S. Cl. ...................... 360/99.08; 360/75; 360/69; 360/73.03; 310/90; 384/100
(58) Field of Search .......................... 360/97.01, 97.03, 360/98.07, 99.04, 99.08, 71, 73.01, 73.03, 69, 75, 55, 265.6; 384/1, 100; 369/53.1, 53.3, 269; 310/90

(56) References Cited

U.S. PATENT DOCUMENTS

| | | | | |
|---|---|---|---|---|
| 5,642,943 A | * | 7/1997 | Szeremeta | 384/100 |
| 5,969,448 A | * | 10/1999 | Liu et al. | 310/90 |
| 6,400,522 B1 | * | 6/2002 | Milligan | 360/69 |
| 6,505,968 B1 | * | 1/2003 | Fleury et al. | 384/1 |
| 6,556,387 B1 | * | 4/2003 | Misso et al. | 360/265.6 |

FOREIGN PATENT DOCUMENTS

JP          06-150527          * 5/1994

* cited by examiner

*Primary Examiner*—Andrew L. Sniezek
(74) *Attorney, Agent, or Firm*—Morrison & Foerster LLP

(57) ABSTRACT

Hard disk drive track density is increased by selectively increasing the stiffness of a fluid dynamic bearing (FDB) motor during servo write. Applying a load to the shaft of a fixed shaft FDB motor to close the bearing gaps increases stiffness. Alternatively, the disk drive is cooled to increase bearing fluid viscosity or the motor is operated at an increased rotational velocity.

17 Claims, 4 Drawing Sheets

SELECTIVELY STIFF FDB BEARING FOR BETTER SERVO WRITE

CROSS-REFERENCE TO RELATED APPLICATIONS

This application claims benefit of U.S. provisional patent application Ser. No. 60/338,412, filed on Dec. 5, 2001, which is herein incorporated by reference.

BACKGROUND OF THE INVENTION

1. Field of the Invention

The invention relates to field of disk drives and more particularly to the writing of servo tracks onto the disks during manufacture.

2. Description of the Related Art

Disk drive servo tracks are typically written onto a blank magnetic disk after the disk drive has been substantially assembled. While there are many known methods for writing servo tracks onto a blank magnetic disk, the most common methods include the use of a laser interferometer to control a picker that attaches to the ARM assembly of the disk drive and steps the arms and the heads, attached to the end of the arms, across the disk while writing the servo patterns.

In a mechanically perfect world, servo tracks would be written in perfectly concentric circles as the servo track writer steps the ARM assembly across the disk. However, servo track writers are not mechanically perfect. The resultant imperfections, from whatever source, result in the servo tracks "wandering" from an idealized track center. Tracks spacing is limited by degree to which the written circle track "wanders" from the idealized track center in a nonuniform way.

A significant mechanical source for imperfections in the servo write process is the "run out" of the spindle motor. "Run out" is the amount of radial excursion of the motor in response to dynamic forces on the motor. In a fluid dynamic bearing ("FDB") motor, the degree of run out is primarily related to the lack of radial stiffness of the fluid dynamic bearing. The stiffness of a fluid bearing is generally related to 1) the size of the gap between bearing surfaces, and 2) the viscosity of the bearing fluid and 3) to the rotational velocity of the motor: The larger the gap, the less viscous the fluid or the slower the rotational velocity (to a point), the looser the bearing.

FIG. 1 shows the general relationship between bearing stiffness and disk rotational velocity of a disc drive FDB motor. It charts the inverse of stiffness (e.g., microinches per 1-g excitation), 1/k, vs. the frequency, f, of rotation for two different bearings. The top curve 10 shows the profile of a relatively loose bearing. The bottom curve 20 shows the profile of a stiffer bearing. Both have peaks, 12 and 22 respectively, and at approximately half the frequency of rotation of the motor.

Increasing radial stiffness of the FDB bearing therefore reduces FDB run out. However, there is a trade-off between bearing stiffness and power consumption: the greater the stiffness, the higher the power consumption. Higher power consumption is extremely undesirable in disk drives for a variety of reasons.

Therefore there is a need to increase FDB bearing radial stiffness without increasing power consumption in order to permit the writing of servo tracks at higher track densities.

SUMMARY OF THE INVENTION

The invention comprises selectively increasing the stiffness of the FDB bearing of an FDB spindle motor only during servo write.

When the FDB bearing structure is of the conical, spool or spherical type, etc., it typically includes a fixed shaft. With these configurations, increased stiffness is preferably provided by selectively compressing the shaft while servo writing. As a shaft compresses, the bearing gap(s) decreases thereby increasing bearing stiffness. A preferred form for providing a compressive load on the shaft is clamping the disk drive into the servo-writing fixture by means of a clamp abutting the disk drive casing at both ends of the shaft. The clamp provides a predetermined load to compress the shaft by a predetermined amount.

When the FDB motor is of a structure that does not have a fixed shaft that cannot be compressed through an externally applied clamping force, bearing stiffness can be increased by substantially reducing the temperature of the disk drive during servo write. This reduction in temperature increases the viscosity of the bearing fluid, which increases bearing stiffness.

Finally, as bearing stiffness is also related to motor rotational velocity, the invention comprises significantly increasing the rotational velocity of the motor during servo write.

An alternate manner of reducing the bearing gaps is to provide an electromagnetic structure affixed between the rotating and fixed elements of the FDB motor. The electromagnet can be selectively energized during servo write. The electromagnet attracts the rotating elements towards the fixed elements thereby increasing the stiffness of the bearing.

In one form, an armature in the form of an annular steel plate is attached to one end of the FDB motor's rotating hub. An annular U-shaped stator is mounted on the fixed elements of the motor, or alternatively on the disk drive casing, facing the steel plate. Coils are wound within the U-shaped armature. When energized, magnetic flux flows between the ends of this U-shaped stator through the steel armature thereby attracting it toward the U-shaped stator.

DESCRIPTION OF THE PREFERRED EMBODIMENTS

The disk drives and FDB motors shown and described in connection with figures are set forth only with sufficient detail necessary to understand the invention.

Figure 2:
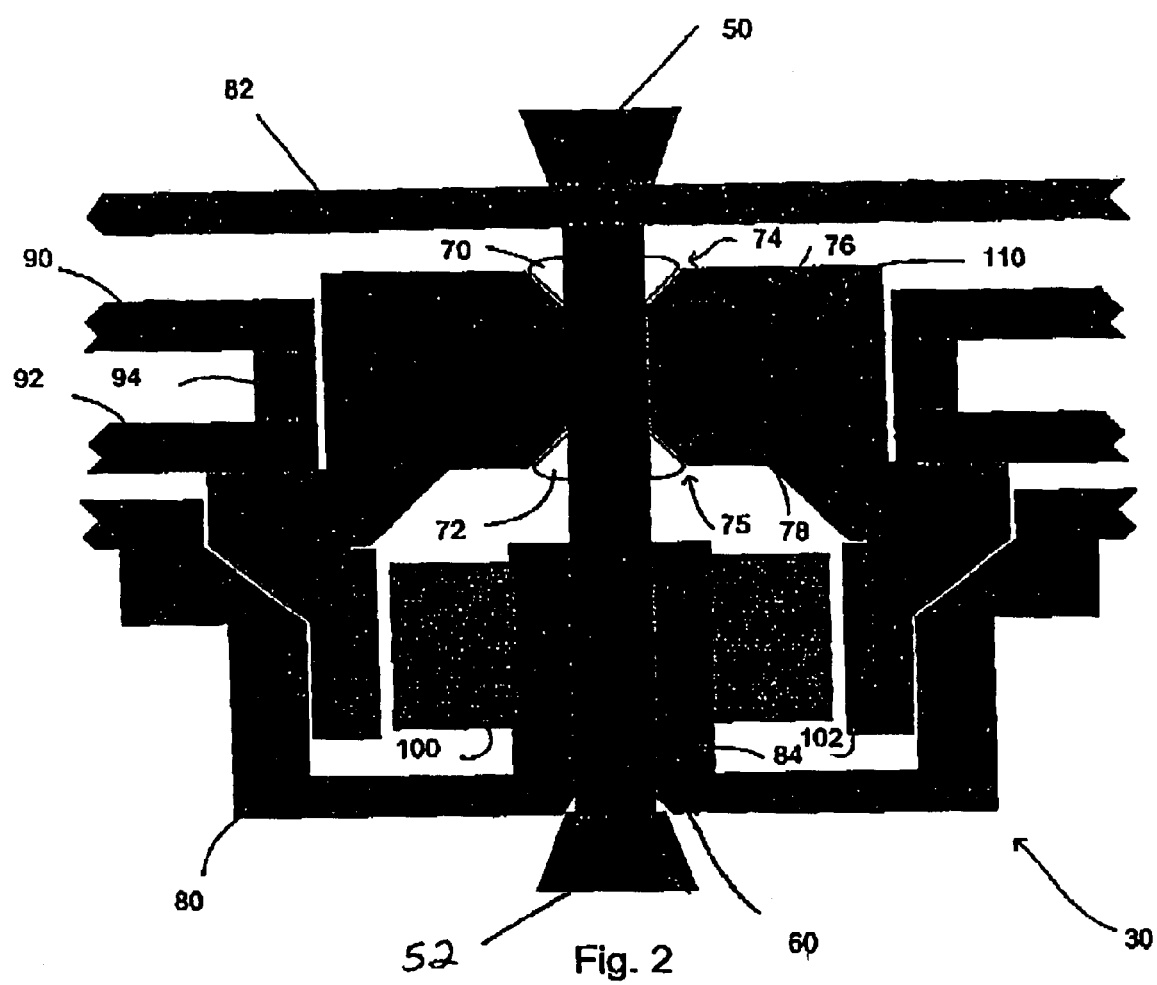
FIG. 2 is a partial cross-sectional view of a disk drive having a conical bearing FDB motor. The disk drive is shown mounted in a fixture by means of clamps abutting the disk drive at both ends of the motor's fixed shaft.

Referring to FIG. 2, disk drive 30 is shown mounted in a servo writer (most of whose structure is omitted for sake of clarity) by means of a clamp 50 and 52. Clamp members 50 and 52 abut the disk drive 30 at both ends of the FDB motor's 40 fixed shaft 60.

The FDB motor 40 is of the conical variety. It includes a fixed shaft 60 (typically stainless steel) interference mounted into a boss 84 of a base casting 80 (sheet metal) of the disk drive 30. The other end of the shaft 60 is affixed, typically by a screw (not shown) to the top cover 82 (sheet metal) of the disk drive casing. The FDB motor 40 further includes hub 110 (stainless steel) rotably mounted on the shaft by means of conical bearings 70 and 72. The conical bearings 70 and 72 are typically fixedly mounted on shaft 60. The interface between bearings 70 and 72 and the conical facing surfaces 76 and 78 of the rotable hub 110 provide respective bearing surfaces. One or both of these surfaces are grooved (not shown). These bearing surfaces are separated by gaps 74 and 75 conventionally filled with a fluid (oil, air) to provide lubrication between the surfaces of the bearing. When the motor 40 rotates, the grooves of the bearing surfaces increase the pressure of the fluid in the gaps 74 and 75 and form a bearing: the greater the pressure, the stiffer the bearing.

Also shown in the figure are stator elements 100 mounted on the aforesaid boss 84 of the base casting 80. Annular magnet 102 is shown mounted on the rotating hub 110 facing stator 100. Magnetic disks 90 and 92 are mounted on hub 110 by means of a disk clamping means (not shown) and separated from each other by a disk spacer 94.

Clamp lower member 52 directly abuts the bottom end the shaft 60. Clamp upper member 50 abuts the top cover 82 of the disk drive adjacent the point of attachment of the shaft 60 to top cover 80. Clamps 50 and 52 cooperate to apply a predetermined compressive force on shaft 60. This compressive force compresses the shaft 60 by a predetermined amount. When shaft 60 compresses, the bearing gaps 76 and 75 between conical bearings 70 and 72 and the respective bearing surfaces 76 and 78 on hub 110 also compress. This gap compression increases the stiffness of the bearings.

Conical bearings 70 and 72 have a bearing surface at an angle to the shaft 60. This angle provides stiffness in both the axial, that is, along the shaft 60, and in the radial, that is, perpendicular to shaft and parallel to the disks 90 and 92, directions. TIncreased stiffness in the radial direction directly reduces radial runout of the motor 40 and thereby permits improved servo write performance. However, increased stiffness in the axial direction also reduce runout because it reduces vibrational modes excited by axial movement that contribute to the unbalancing forces that contribute runout.

Figure 3:
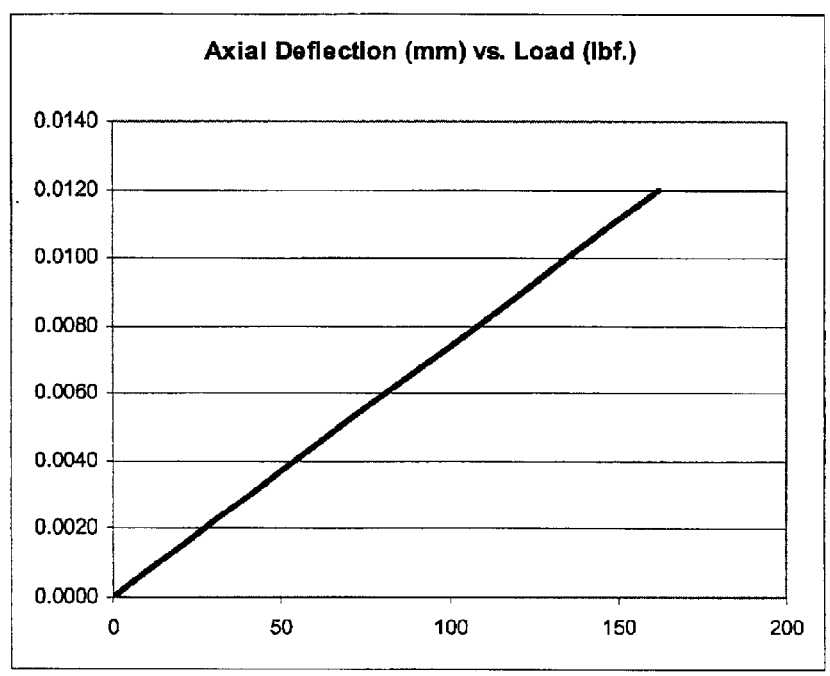
FIG. 3 is a chart showing the axial deflection vs. load of the fixed shaft of an embodiment of the invention according to FIG. 2.

FIG. 3 is a graph of the axial deflection in mm vs. load in foot pounds of a column of 440C SST stainless steel (modulus of elasticity=2E+11 Pa, yield strength=1.9E+09 Pa) having the following dimensions: O.D. 2.8=mm; length=20 mm; cross-sectional area=6.1575216 square mm. Axial deflection at 175 foot-pounds is 0.0126 mm. As illustrated, shaft compression is a linear function of load.

Figure 4:
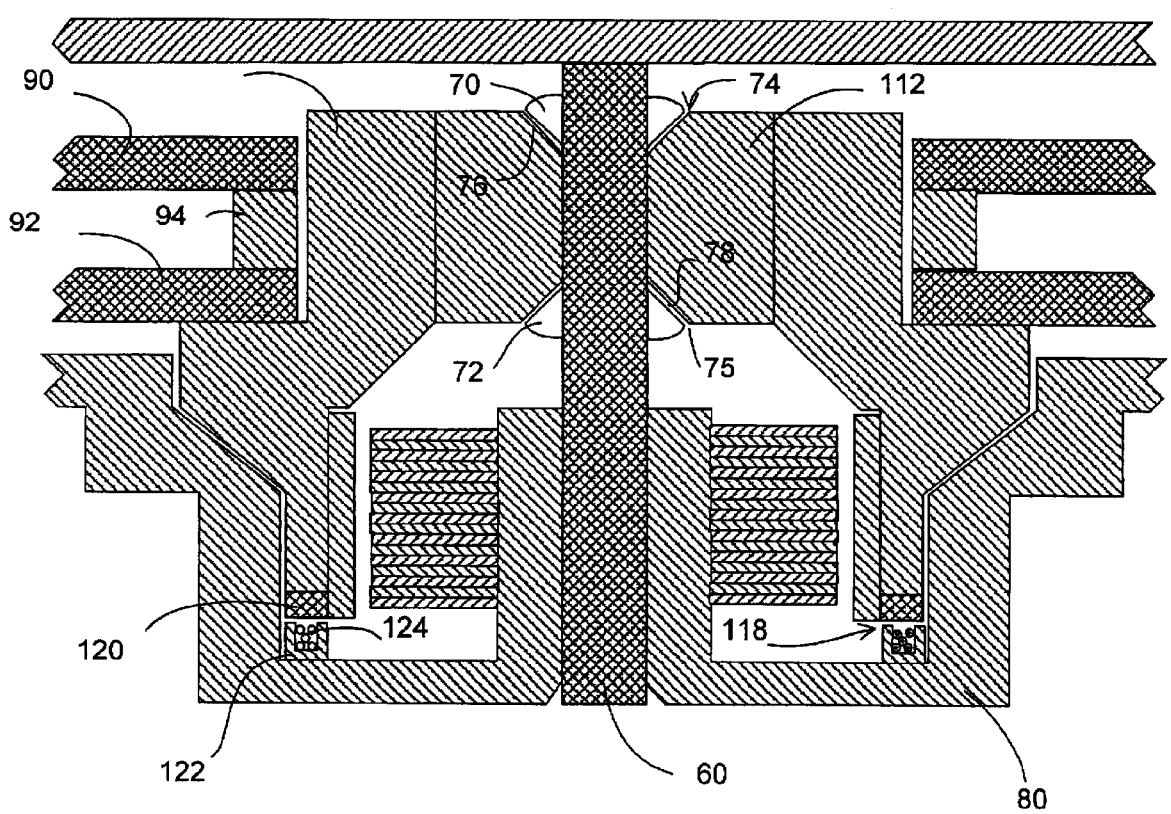
FIG. 4 is a partial cross-sectional view of a disk drive having a conical bearing FDB motor including and alternate embodiment of the present invention. And electromagnet is shown mounted at the lower end of the disk-mounting hub.

FIG. 4 illustrates an alternate embodiment of the present invention. This embodiment is useful whenever an external clamp is not available to compress shaft 60. Here the compressive load is provided by an electromagnet 118 located between one end of the hub 110 and base 80. Electromagnet 118, when actuated, attracts the hub 110 towards base 80. This operates to compress bearing gap 75, which increases its radial stiffness.

Figure 1:
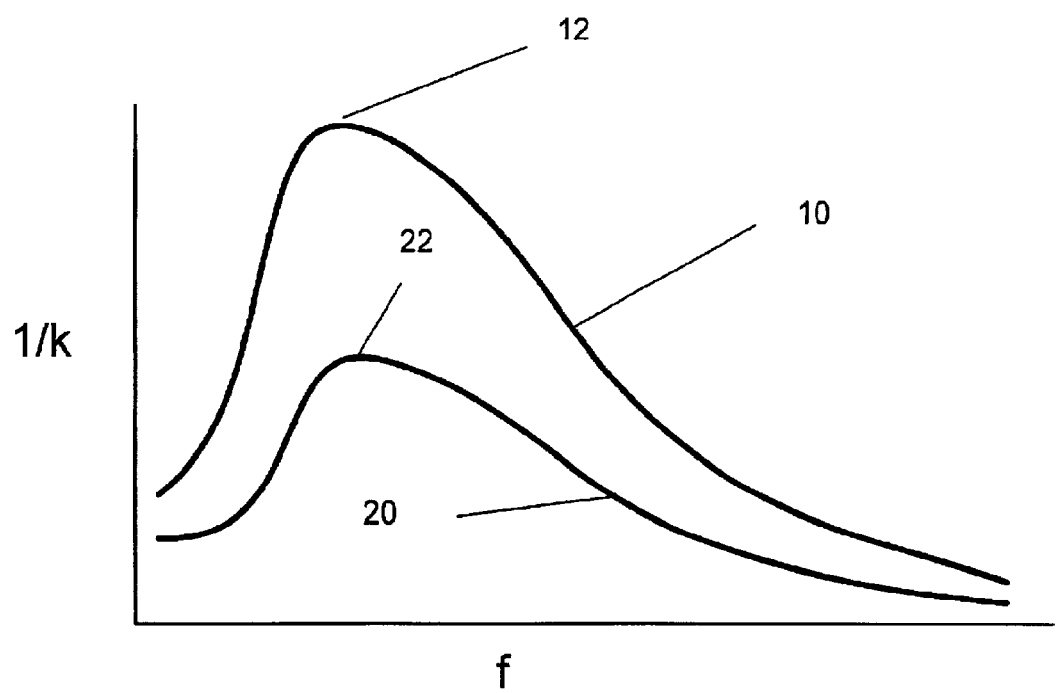
FIG. 1 is a chart showing the relationship of the inverse of stiffness vs. disk rotational frequency of two different FDB bearings.

In the figure, hub 110 is comprised of aluminum and is fixed to a member 112 composed of stainless steel. Such a configuration provides stainless-steel bearing surfaces, 76 and 78, while permitting disks 90 and 92, which are typically composed of aluminum, to be mounted on a hub of the same material for the purpose of matching coefficients of thermal expansion. (This embodiment will work in the FDB motor configuration of FIG. 1 if the stainless steel of that embodiment's hub 110 is magnetic.)

With this hub configuration, the electromagnet is composed of a annular steel ring 120 (armature) mounted on hub 110, opposed by a U-shaped ring 122 (stator) mounted on the base 80. Coils 124 are mounted within the prongs of the "U". When actuated, current flowing in coils 124 induces magnetic flux between the prongs of the "U," which flows through ring 120. This causes ring 120 to be drawn toward U-shaped ring 122.

This configuration can also be used in rotating shaft FDB motors such a shown in, for example, U.S. Pat. No. 6,183,385, which is hereby incorporated by reference.

Figure 5:
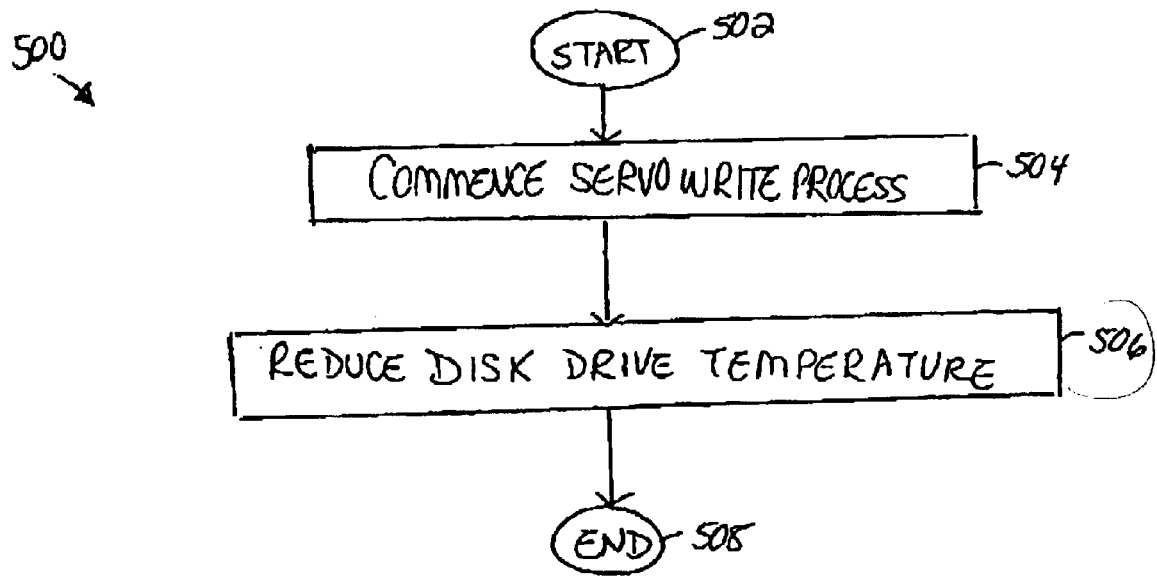
FIG. 5 is a flow diagram illustrating a method for increasing FDB bearing stiffness, according to one embodiment of the present invention.

FIG. 5 is a flow diagram illustrating a method 500 for increasing FDB bearing stiffness, according to one embodiment of the present invention. The method 500 is initialized at step 502 and proceeds to step 504, where the method 500 commences to servo write process. In step 506, the method 500 reduces the temperature of the disk drive during servo write. This reduced temperature increases the viscosity of the bearing's fluid, which thereby increases bearing stiffness. The method 500 terminates at step 508.

Figure 6:
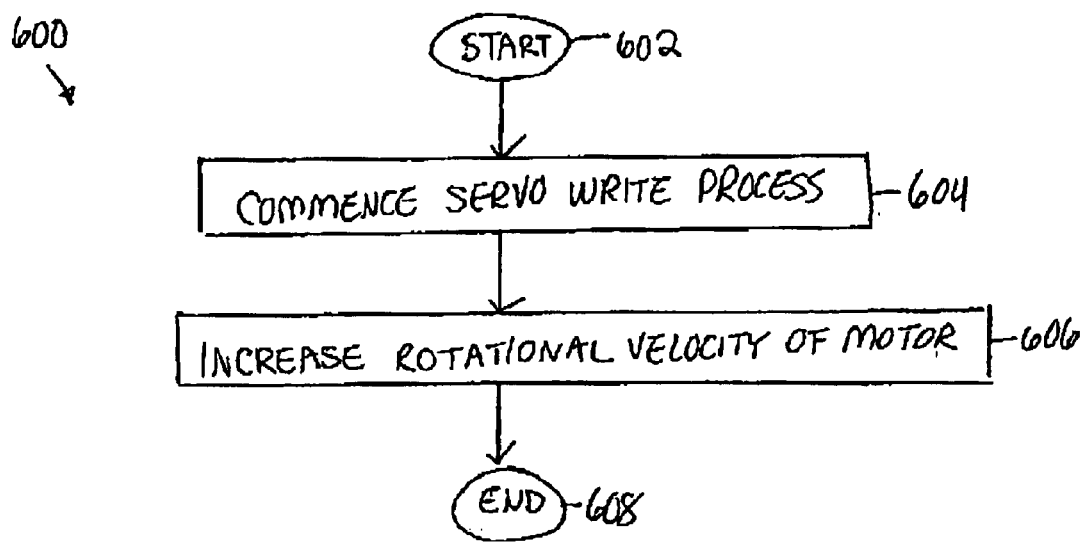
FIG. 6 is a flow diagram illustrating a method 600 for increasing FDB bearing stiffness, according to another embodiment of the present invention.

FIG. 6 is a flow diagram illustrating a method 600 for increasing FDB bearing stiffness, according to another embodiment of the present invention. The method 600 is initialized at step 602 and proceeds to step 604, where the method 600 commences the servo write process. In step 606, the method 600 increases the rotational velocity of the motor during servo write. The method 600 terminates at step 608.

These, and in general, all methods for selectively increasing FDB bearing stiffness during servo write are contemplated to be within the scope of the present invention. Depending on the construction of the bearing, which can be any type of thrust, conical, spool or spherical bearing, increased stiffness need not only be applied to those bearing components that provide radial stiffness. If possible, increasing the stiffness of all the bearing components in a nonselective manner will automatically reduce runout.

We claim:

1. A method for reducing run out of an FDB motor during servo write, comprising the steps of:

increasing the stiffness of the FDB motor's bearings during servo write; and decreasing the stiffness of the bearing after servo write.

2. The method of claim 1 wherein said increasing step comprises compressing the FDB motor's shaft.

3. The method of claim 2 wherein said compressing step comprises applying a compressive load to said shaft.

4. The method of claim 2 wherein said compressing step comprises applying a compressive load to the shaft by a means of a clamping tool abutting each end of the shaft.

5. The method of claim 2 wherein said compressing step comprises an electromagnet mounted at one end of the rotating elements of the FDB motor that operates when actuated to reduce the gap of at least one of the FDB motor bearings.

6. The method of claim 1 wherein said increasing step comprises increasing the rotational velocity of the FDB motor.

7. The method of claim 1 wherein said increasing step comprises significantly reducing the temperature of the FDB motor during servo write so as to increase the viscosity of the fluid of the FDB's motors bearings.

8. The method according to claim 1 wherein said FDB motor has at least one conical bearing and said method of increasing the stiffness of said FDB motor bearings includes selectively reducing the gap of said conical bearing.

9. Apparatus for increasing the stiffness of an FDB motor during servo write, comprising:

an FDB motor bearing having a stiffness; and means for selectively increasing the stiffness of said bearing by applying a compressive load, wherein said means for selectively increasing the stiffness of said bearing comprises:

electromagnetic means mounted on the rotating elements of the FDB motor for attracting said rotating elements in an axial direction vis-a-vis the shaft of FDB motor.

10. Apparatus according to claim 9, wherein said means for selectively increasing the stiffness of said bearing comprises:

means for selectively providing a compressive load on the shaft of said FDB motor.

11. Apparatus according to claim 10, wherein said means for providing a compressive load on said shaft comprises:

means for selectively clamping each end of said shaft.

12. The apparatus according to claim 9, wherein said means for selectively increasing the stiffness of said bearing comprises:

at least one conical bearing; and means for selectively reducing the gap of said conical bearing.

13. Apparatus for increasing the stiffness of an FDB motor during servo write, comprises:

an FDB motor bearing having a stiffness; and means for selectively increasing the stiffness of said bearing by applying a compressive load, wherein said means for selectively increasing the stiffness of said bearing comprises:

electromagnetic means mounted on the rotating elements of the FDB motor for attracting said rotating elements in a direction that reduces the gap of at least one of the FDB motor's bearings.

14. Apparatus according to claim 13, wherein said electromagnetic means comprises:

an annular steel ring mounted on one axial end of the rotating elements of said FDB motor;

an annular U-shaped ring mounted in a fixed relationship to said rotating elements and facing said annular steel ring; and a current bearing coil mounted in said U-shaped ring.

15. Apparatus according to claim 14, wherein said U-shaped ring it is mounted on the casing of a disk drive in which said FDB motor is mounted.

16. Apparatus for increasing the bearing stiffness of the FDB motor during servo write, comprising:

a shaft having two ends;

a releasable clamp abutting said two ends adapted for applying a compressive load too the shaft;

a disk drive casing;

at least one end of said shaft being mounted on said casing; and said clamp abuts said casing.

17. Apparatus according to claim 16, further comprising:

a rotating element; and a conical bearing mounted between said shaft and said rotating element;

wherein said clamp compresses said shaft to reduce the gap of said conical bearing to thereby increase the stiffness of said conical bearing.

* * * * *